Sept. 8, 1959   M. G. A. KLIX   2,903,289
SAFETY BUMPER
Filed Feb. 25, 1958   2 Sheets-Sheet 1
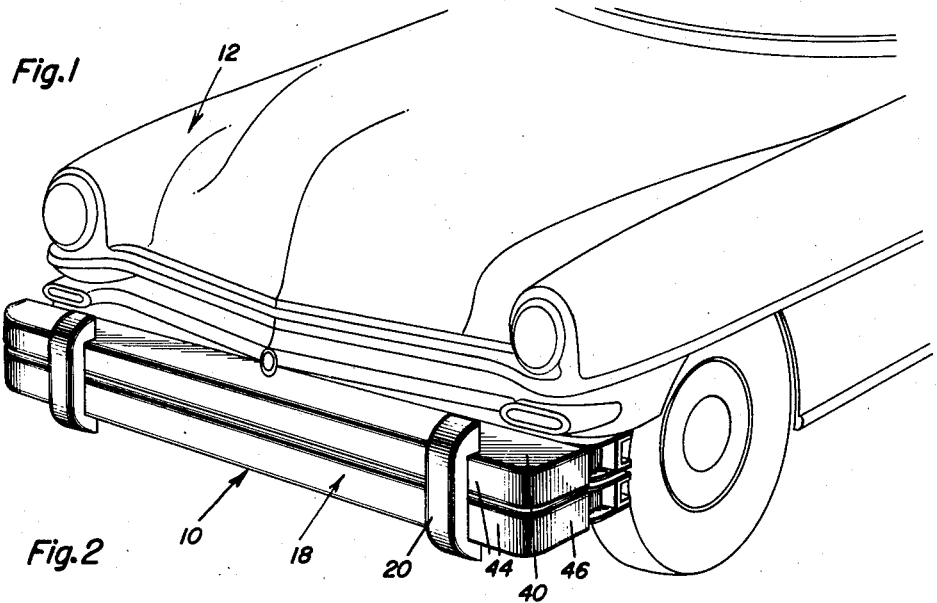
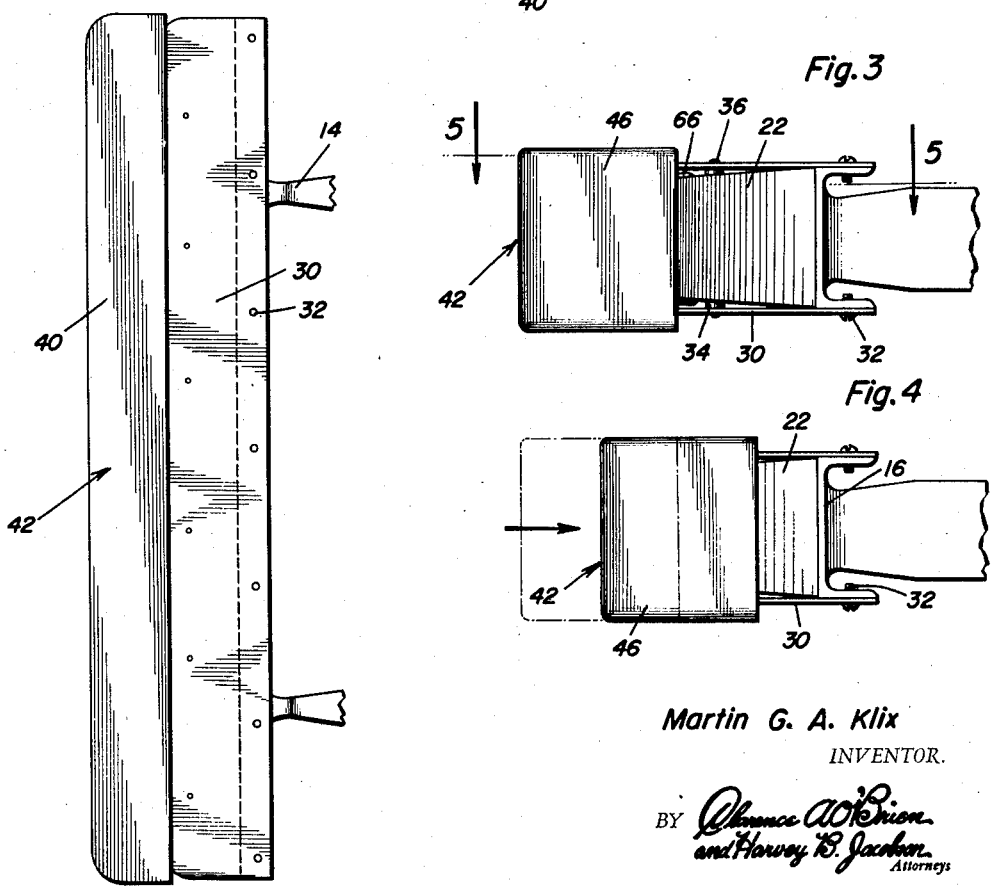
Martin G. A. Klix
INVENTOR.
BY *Clarence A. O'Brien
and Harvey B. Jackson*
Attorneys Sept. 8, 1959  M. G. A. KLIX  2,903,289
SAFETY BUMPER
Filed Feb. 25, 1958  2 Sheets-Sheet 2
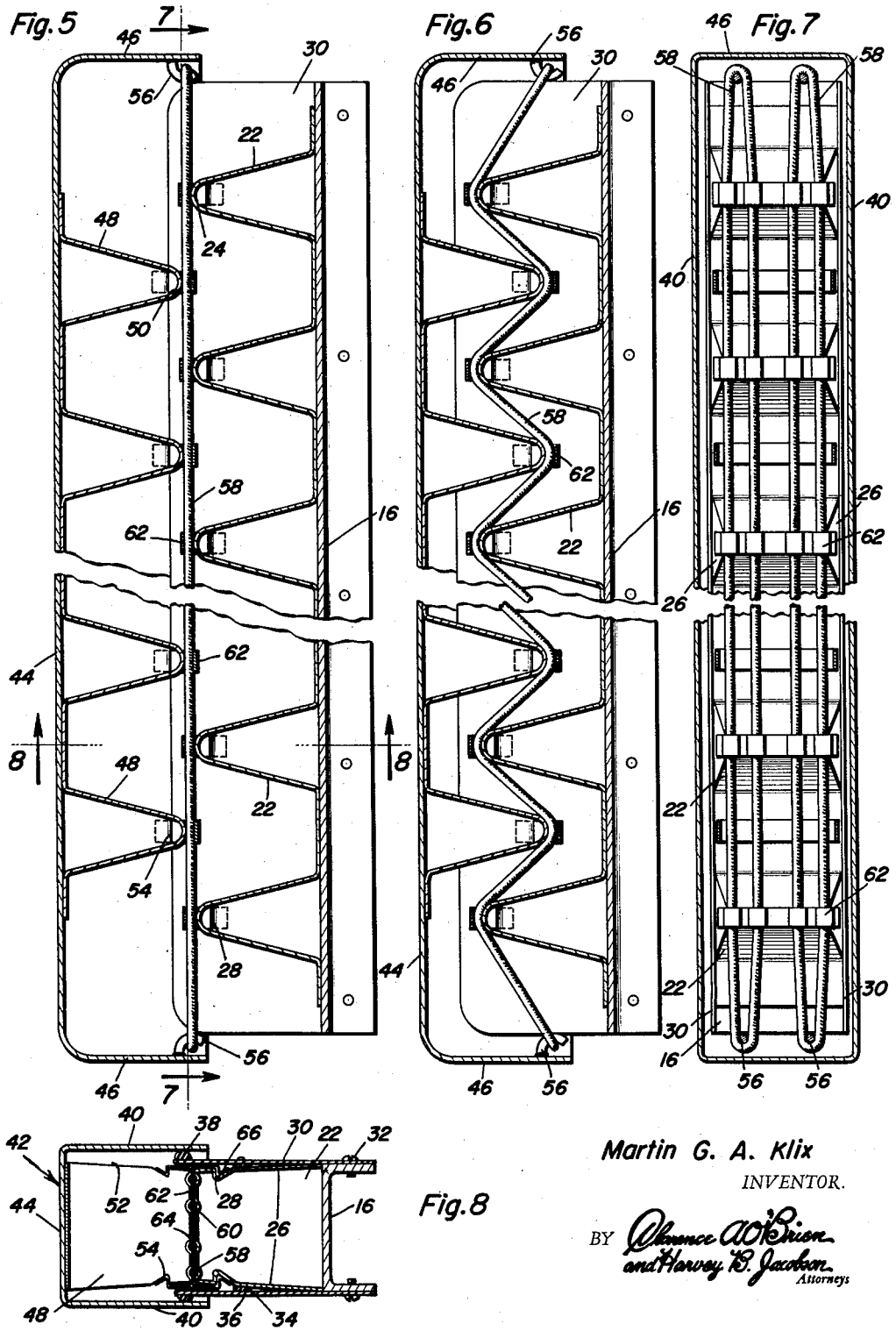
Martin G. A. Klix
INVENTOR.

United States Patent Office 2,903,289
Patented Sept. 8, 1959

2,903,289

SAFETY BUMPER

Martin G. A. Klix, Bellingham, Wash.

Application February 25, 1958, Serial No. 717,403

6 Claims. (Cl. 293—72)

The present invention generally relates to automobile construction and more particularly to a bumper construction which will provide safety to passengers as well as to the body of the car in the event of collision with other vehicles or stationary objects.

The primary object of the present invention is to provide a bumper construction which may be applied to the usual front and rear locations but also may be applied to the sides of vehicles as well with the principle involved also being possibly incorporated in the interior construction of the automobile for protecting passengers since the construction of the present invention retains a neat and ornamental appearance in that the bumper incorporates a movable bumper head or bar which cooperates with a structure rigid with the front of the vehicle frame with these two elements being separated by rubber or resilient shock absorbing cords.

A further object of the present invention is to provide a vehicle bumper in accordance with the preceding objects in which the vehicle frame and the movable bumper head are each provided with a series of transversely spaced and staggered projections or supports for the shock cord with the shock cord normally extending straight across and between the shock cord supports whereby force or movement of the movable bar will cause the cord to be deformed into a zig-zag condition thus elongating and tensioning the cord whereby the cord will absorb the shock and cushion the movement of the movable bar.

A further important feature of the present invention is to provide a bumper construction which is extremely safe in operation, adapted for use on various types of automobiles or other types of vehicles, easy to attach, well adapted for its intended purposes and relatively inexpensive to manufacture due to its simplicity of construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the front of an automobile illustrating the bumper construction of the present invention attached thereto;

Figure 2 is a plan view of the bumper construction;

Figure 3 is a side elevational view of Figure 2 illustrating the bumper construction in normal condition;

Figure 4 is a side elevation of the bumper construction similar to Figure 3 but illustrating the bumper in the condition that it would assume from a force being applied to the movable bar;

Figure 5 is a sectional view taken substantially upon a plane passing along section line 5—5 of Figure 3 illustrating the abutments or projections which support the shock cords and the relationship thereof when in normal condition;

Figure 6 is a sectional view similar to Figure 5 but illustrating the bumper in its collapsed condition which is similar to the condition shown in Figure 4;

Figure 7 is a longitudinal sectional view taken substantially upon a plane passing along section line 7—7 of Figure 5; and Figure 8 is a transverse sectional view taken substantially upon a plane passing along section line 8—8 of Figure 5.

Referring now specifically to the present drawings, the numeral 10 generally designates the safety bumper of the present invention which is adapted to be mounted on an automobile generally designated by the numeral 12 which may be of any suitable construction and which incorporates forwardly projecting frame rails or support brackets 14 which terminate in a transversely extending channel shaped member 16 having the web thereof vertical and he legs thereof extending in the horizontal position rearwardly of the vertical web. The transverse stationary bar 16 may be of unitary construction with the frame rails 14 or may be separate therefrom. Also, there is normally employed two separate bumper units each of which are designated by the numeral 18 with these units being interconnected by the usual bumper guards 20 in order to prevent the canting and binding which would normally occur if only a single unit 18 were employed and the bumper guards 20 were relatively long and force was applied to the upper or lower end thereof.

Rigid with the vertical web of the channel shaped bar 16 and secured to the outer surface thereof and projecting from the outer surface thereof is a plurality of U-shaped abutments or projections 22 which may be made of sheet metal and provided with rounded outer ends 24. The U-shaped projections 22 are interconnected and secured to the bar 16 by any suitable means such as by welding or the like. These U-shaped projections or abutments 22 also are provided with top and bottom walls 26 which have a depressed or recessed portion 28 adjacent the outer end thereof. Dust guards or sheet metal members 30 are secured to the outer surface of the flanges of the transverse bars 16 by fastening members 32 and the dust guards 30 are resiliently supported from the top and bottom walls 26 by a resilient grommet 34 and a fastener 36 extending therethrough. The free end of each of the dust guards 30 is provided with a rubber projection 38 for slidingly and resiliently engaging the top and bottom walls 40 of a U-shaped bumper head or movable bar generally designated by the numeral 42 which includes a bight portion 44 substantially in parallel relation to the transverse bar 16. The ends of the bight portion 44 are curved rearwardly as indicated by the numeral 46 and interconnect the top and bottom walls 40.

Secured to and projecting inwardly from the bight portion 44 of the movable bar 42 is a plurality of U-shaped projections 48 indentical in shape and size to the U-shaped projections or abutments 22 which are also provided with rounded ends 50 and top and bottom walls 52 provided with recessed areas or depressions 54.

The ends of the rearwardly extending members 46 are provided with hooks 56 for receiving a portion of an endless shock cord 58 constructed of rubber and which is disposed with two parallel ends with the loops at the ends of the parallel runs being disposed over the hooks 56. There is illustrated a pair of shock cords 58 with there being two hooks on each end of the movable bar or bumper head 42. As illustrated in Figure 5, the shock cords 58 normally extend in substantially straight line condition and in engagement with the rounded ends 24 and 50 of the opposed projections 22 and 48.

As illustrated in Figure 8, the rounded ends 24 and 50 are provided with a series of vertically spaced indentation 60 and for holding the shock cords in position, a U- shaped clip 62 is provided with the clip also having indentations 64 therein for receiving the shock cords 58. The free ends of the U-shaped clips 62 are provided with depending hook shaped projections 66 for spring urged engagement with the depressed areas 28 thus detachably mounting the clips 62 in position and orientating the shock cords 58 and holding the shock cords 58 to the rounded ends 24 and 50 respectively.

The bumper is normally in the condition illustrated in Figure 5 and when force is applied to the bumper head 42, the same moves rearwardly by elongating the shock cords 58 and disposing the same substantially in a zigzag condition as illustrated in Figure 6. During the elongation of the shock cords, the shock cords will absorb the shock and resist movement of the movable bar. The shock cords are slightly stretched when placed upon the hook fasteners which ensures a snug fit and the size and number of shock cords can be varied depending upon the weight of the vehicle and the probable speed. Also, the bumper should be constructed so that it extends not less than two-thirds of its depth out of the bottom of the vehicle to assure adequate room for the necessary movement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A bumper construction for a vehicle comprising at least a pair of transversely spaced abutments adapted to be supported from a vehicle, a movable bumper bar, at least one abutment on said bar in facing relation to the pair of abutments on the vehicle disposed intermediate the pair of abutments for movement between the pair of abutments when the movable bar is moved towards the vehicle, an elongated resilient member tensioned between and anchored to the ends of the movable bar and extending in a straight condition between said one abutment on one side thereof and the pair of abutments on the other side, said resilient member being attached to the pair of abutments and being elongated when the movable bar and the one abutment are moved toward the pair of abutments thus forming the resilient member into zigzag shape thereby stretching the resilient member and cushioning movement of said bar, and means connected to the bar and adapted to be supported from the vehicle for limiting movement of said bar in both directions.

2. A vehicle bumper comprising an elongated transverse stationary bar adapted to be mounted on a vehicle, a movable bar disposed in spaced parallel relation to the stationary bar and movably carried thereby, resilient means disposed between said bars for cushioning said movable bar, said stationary bar including a plurality of transversely spaced and aligned abutments with each abutment having a vertically disposed rounded end for engagement with one side of the resilient means, said movable bar including a plurality of transversely spaced and aligned abutments with each abutment having a vertically disposed rounded end for engagement with the other side of the resilient means, said abutments on the stationary bar being staggered in relation to and facing the abutments on the movable bar for movement into interdigitated relation when force is applied to the movable bar thereby urging the movable bar towards the stationary, said resilient means including a flexible resilient line having the ends thereof anchored to the bar and normally extending in a straight condition between the ends of the staggered abutments whereby movement of the abutments into interdigitated relation will form the line into zig-zag condition thus elongating and tensioning the line while it resists movement of the movable bar towards the stationary bar.

3. The combination of claim 2 wherein the rounded end of each of said abutments is provided with a plurality of vertically spaced indentations, said resilient line being endless and in the form of a plurality of runs with the runs being disposed in the indentations and the loop ends attached to the movable bar, and a resilient U-shaped clip holding the runs of the line in the indentations, said clip having recesses for firmly gripping the runs of the line.

4. The combination of claim 3 wherein the ends of said movable bar are provided with hooks for engagement with the loops defined by the runs of the line.

5. The combination of claim 4 wherein said stationary bar is provided with upper and lower dust shields extending forwardly therefrom and having rubber strips on the surfaces thereof for engagement with the stationary bar and moveable bar respectively for sealing the bumper unit from dust.

6. In combination with a vehicle having a frame, a pair of spaced and aligned abutments, means mounting said abutments rigid with said frame, a movable bumper bar disposed in spaced and aligned relation to the pair of abutments, an abutment rigid with the movable bumper bar and being disposed in facing relation to the pair of abutments and disposed intermediate the pair of abutments for movement between the pair of abutments when the movable bar moves towards the pair of abutments, an elongated resilient member extending between the pair of abutments and the abutment on the movable bumper bar with the member being tensioned and attached to the ends of the movable bumper bar and normally extending in straight line condition between the pair of abutments and the abutment carried by the bumper bar, means on said pair of abutments for securing the resilient member thereto whereby elongation of the resilient member as the abutment on the bumper bar moves between the abutments on the vehicle frame whereby the resilient member will absorb and cushion the movement of the movable bar and will return the movable bumper bar to a position remote from the vehicle frame when the pressure is removed from the bumper bar.

References Cited in the file of this patent

UNITED STATES PATENTS

| | | |
|---|---|---|
| 1,686,536 | Schauman | Oct. 9, 1928 |
| 1,703,030 | Finn | Feb. 19, 1929 |
| 1,957,515 | Williams | May 8, 1934 |
| 2,144,357 | Booharin | Jan. 17, 1939 |